United States Patent
Vella et al.

(10) Patent No.: US 8,325,810 B2
(45) Date of Patent: *Dec. 4, 2012

(54) MOTION ESTIMATION METHOD AND STABILIZATION METHOD FOR AN IMAGE SEQUENCE

(75) Inventors: Filippo Vella, Erice (IT); Massimo Mancuso, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 2969 days.

This patent is subject to a terminal disclaimer.

(21) Appl. No.: 10/462,090

(22) Filed: Jun. 13, 2003

(65) Prior Publication Data

US 2004/0027454 A1    Feb. 12, 2004

(30) Foreign Application Priority Data

Jun. 19, 2002   (EP) .................................... 02425402

(51) Int. Cl.
- *H04N 7/12* (2006.01)
- *H04N 11/02* (2006.01)
- *H04N 11/04* (2006.01)

(52) U.S. Cl. ......... 375/240.16; 375/240.12; 375/240.13; 375/240.24; 348/208.99

(58) Field of Classification Search ............ 375/240.12–240.16, 240.24; 348/208.99
See application file for complete search history.

(56) References Cited

U.S. PATENT DOCUMENTS

| | | | |
|---|---|---|---|
| 4,864,409 A | 9/1989 | Platte et al. ................ 358/222 |
| 5,012,270 A | 4/1991 | Sekine et al. | |
| 5,107,293 A * | 4/1992 | Sekine et al. .............. 396/55 |
| 5,109,249 A * | 4/1992 | Kitajima ................. 396/53 |
| 5,267,034 A * | 11/1993 | Miyatake et al. ............ 348/352 |
| 5,291,300 A * | 3/1994 | Ueda ........................ 386/117 |
| 5,311,305 A * | 5/1994 | Mahadevan et al. .......... 348/169 |

(Continued)

FOREIGN PATENT DOCUMENTS

EP    0 762 774 A2    3/1997

(Continued)

OTHER PUBLICATIONS

Engelsberg, A. et al., "A Comparative Review of Digital Image Stabilising Algorithms for Mobile Video Communications," *IEEE Trans. on Consumer Electronics* 45(3):591-597, Aug. 1999.

Ko, S. et al., "Digital Image Stabilizing Algorithms Based on Bit-Plane Matching," *IEEE Trans. on Consumer Electronics* 44(3):617-622, Aug. 1998.

Ko, S. et al., "Fast Digital Image Stabilizer Based on Gray-Coded Bit-Plane Matching," *IEEE Trans. on Consumer Electronics* 45(3):598-603, Aug. 1999.

(Continued)

*Primary Examiner* — David Czekaj
*Assistant Examiner* — Chikaodili E Anyikire
(74) *Attorney, Agent, or Firm* — Seed IP Law Group PLLC

(57) ABSTRACT

A method of estimating a global motion vector representative of the motion of a first digital image with respect to a second digital image, the first and the second image forming part of a sequence of images and being made up of, respectively, a first and a second pixel matrix. The method estimates the global motion vector on the basis of the estimate of at least one motion vector of at least one region of the first image representative of the motion of the at least one region from the first image to the second image and comprising phases of: subdividing the at least one region of the first image into a plurality of pixel blocks, assigning to each block of the plurality a respective weighting coefficient calculated on the basis of a respective inhomogeneity measure, and estimating the at least one motion vector of said at least one region on the basis of the weighting coefficients assigned to each block of the at least one region.

17 Claims, 9 Drawing Sheets

U.S. PATENT DOCUMENTS

| | | | |
|---|---|---|---|
| 5,331,414 A * | 7/1994 | Golin | 348/390.1 |
| 5,432,893 A * | 7/1995 | Blasubramanian et al. | 345/600 |
| 5,682,205 A | 10/1997 | Sezan et al. | |
| 5,909,242 A | 6/1999 | Kobayashi et al. | 348/208 |
| 6,169,574 B1 | 1/2001 | Noguchi et al. | |
| 6,628,711 B1 * | 9/2003 | Mathew et al. | 375/240.12 |
| 6,748,158 B1 * | 6/2004 | Jasinschi et al. | 386/241 |
| 6,809,758 B1 * | 10/2004 | Jones | 348/208.99 |
| 2002/0036692 A1 * | 3/2002 | Okada | 348/208 |
| 2002/0039138 A1 * | 4/2002 | Edelson et al. | 348/208 |
| 2003/0072373 A1 * | 4/2003 | Sun | 375/240.16 |
| 2005/0243178 A1 * | 11/2005 | McConica | 348/208.99 |

FOREIGN PATENT DOCUMENTS

| | | |
|---|---|---|
| EP | 1 117 251 A1 | 7/2001 |
| EP | 1 139 669 A1 | 10/2001 |
| WO | WO 99/12355 | 3/1999 |

OTHER PUBLICATIONS

Paik, J. et al., "An Adaptive Motion Decision System for Digital Image Stabilizer Based on Edge Pattern Matching," *IEEE Trans. on Consumer Electronics* 38(3):607-616, Aug. 1992.

Uomori, K. et al., "Automatic Image Stabilizing System by Full-Digital Signal Processing," *IEEE Trans. on Consumer Electronics* 36(3):510-519, Aug. 1990.

Rovati et al., "An Innovative, High Quality and Search Window Independent Motion Estimation Algorithm and Architecture for MPEG-2 Encoding," IEEE Transactions on Consumer Electronics, vol. 46, No. 3, Aug. 2000, 9 pages.

Vella et al., "Robust Digital Image Stabilization Algorithm Using Block Motion Vectors," IEEE International Conference on Consumer Electronics, Los Angeles, California, Jun. 18-20, 2002, pp. 234-235.

* cited by examiner

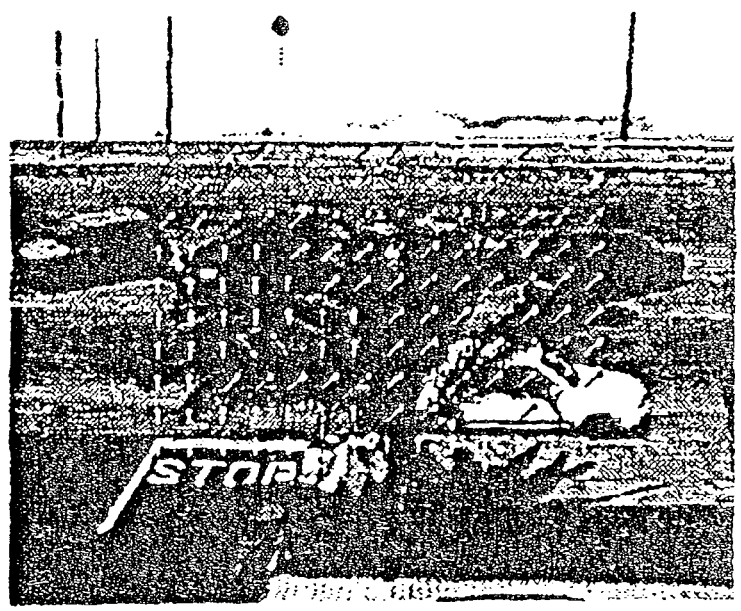
Figure 7A. Input frame with Foreground BMVs

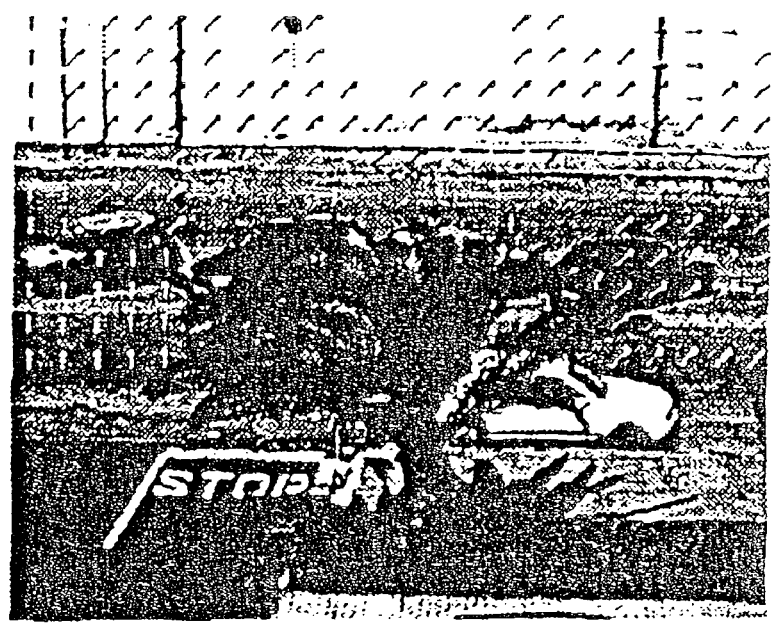
Figure 7B, Input Frame with Background BMVs

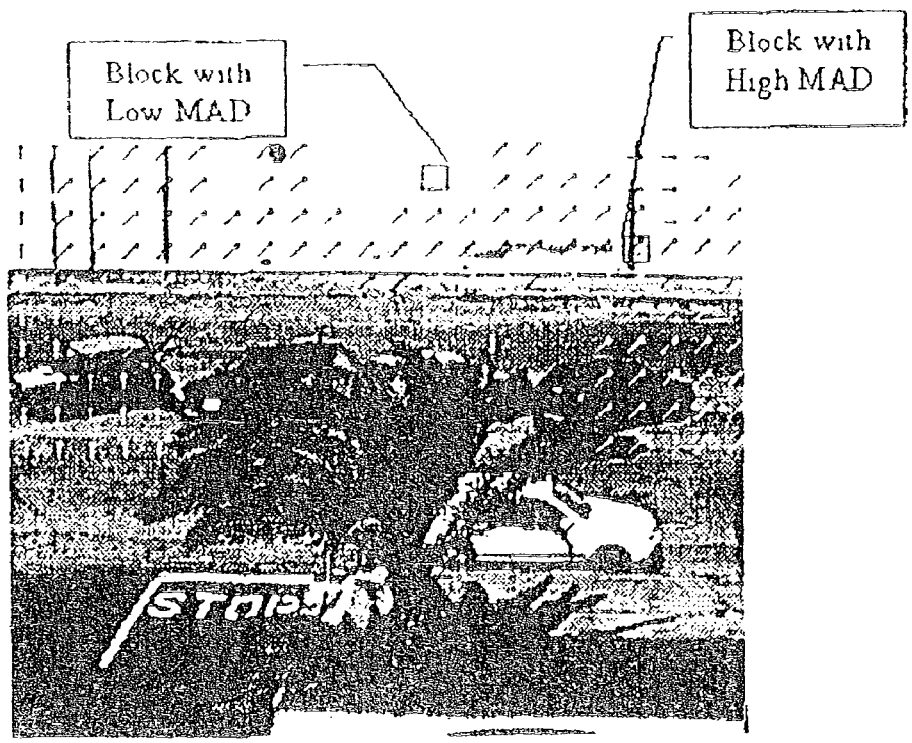
Figure 8, Different MAD values for image blocks

MOTION ESTIMATION METHOD AND STABILIZATION METHOD FOR AN IMAGE SEQUENCE

FIELD OF THE INVENTION

The present invention is concerned with digital image processing and, more particularly, regards a motion estimation method and a stabilization method for an image sequence.

BACKGROUND OF THE INVENTION

Digital images are nowadays used in many different applications, a case in point being such traditional acquisition devices as digital still and video cameras. One must also expect an ever greater use of digital images in devices of the new generation, for example, in mobile multimedia communication terminals.

There exist numerous devices or applications that use digital images acquired in sequence, i.e., images acquired with a brief time interval between one image and the next and representing approximately one and the same real scene.

The acquisition rate of the sequence, i.e., the number of images acquired in a given time interval, may vary in accordance with the specific applications; for example, the rate will be very high in digital video cameras (about 25 images per second) and lower in mobile communication terminals (about 15 images per second) that acquire the digital images and transmit them in real time to a remote terminal.

The number of digital images comprised in the sequence can likewise vary within wide limits: for example, the sequence may contain a large number of images (video sequence), but there are also many known specific applications of digital photography for which it is sufficient to acquire sequences containing just a few images (two or three, for example).

It is known that the image sequences are often affected by unwanted displacements/motions between images produced in the acquisition phase. Such unwanted motions may be due to, for example, vibrations, fluctuations or micro-oscillations of the acquisition device during the acquisition of the sequence.

There are several known compensation or correction techniques intended to reduce or eliminate these unwanted motions. For example, in digital image processing—and especially in digital photography applications—there are known various techniques that are generally referred to as alignment/registration techniques. When this term is used hereinafter, it is intended to refer particularly to the correction of unwanted motion in sequences that comprise few images (photography or still camera applications).

When digital sequences are acquired for generic video applications, on the other hand, the techniques for compensating these unwanted motions are commonly known by the name of stabilization techniques. When this term is used hereinafter, it is intended to refer particularly to the correction of unwanted motion in sequences that comprise a large number of images (video applications).

In particular, the stabilization of video sequences plays an important part, because—as is well known to persons skilled in the art—it not only eliminates unpleasant oscillations and vibrations that would be visible in the reproduction of these sequences (a film, for example), but also makes it possible to obtain a greater compression efficiency when the sequences are encoded by means of encoding/compression techniques that operate, for example, in accordance with the MPEG standard or the H263 standard and are nowadays extensively used in the greater part of the available commercial devices.

Conventionally, both the alignment/registration techniques and the stabilization techniques correct the acquired sequence after a phase of estimating the relative motions between image pairs of the sequence. This phase, which will hereinafter be referred to as the motion estimation (or Mot_Est) phase, produces an estimate of the motion of the sequence by evaluating, for example, the motion of each image of the sequence with respect to a reference image.

In particular, techniques of motion estimation between a first and a second image that use a motion model on the basis of which the second image corresponds substantially to a rigid rotation/translation of the first image are known by the name of "global motion" techniques. Commonly, the motion model is further simplified and in actual fact the global motion estimation produces an estimation of the relative motion/misalignment between a pair of images in the form of a global motion vector with a vertical translation component and a horizontal translation component.

On the other hand, techniques that characterize the relative motion between a pair of images in the form of a plurality of relative motions between corresponding portions of the pair of images are known as "local motion" estimation techniques. These techniques produce a plurality of local motion vectors (with, for example, vertical and horizontal translation components), each of which is associated with a particular portion of the image.

Though satisfactory in many different respects, the known motion estimation techniques for image sequences are associated with numerous drawbacks and problems bound up with, among others, inadequate performance, complex computations or implementation costs of such an order as to make it difficult to employ them in commercial portable acquisition devices.

Obviously, given these drawbacks/problems, the unwanted motion correction methods known to the state of the art, especially the stabilization methods, based on these known motion estimation techniques are found to be unsatisfactory on account of at least the same reasons.

BRIEF SUMMARY OF THE INVENTION

The present invention therefore sets out to provide a motion estimation method for an image sequence. According to principles of the present invention, a method of estimating a global motion vector is provided. The estimation is carried on the basis of the estimation of at least one motion vector of at least one region. In one embodiment, this is carried out in phases which are comprised of subdividing the region of the first image into a plurality of subregions, then assigning a weighting coefficient to each of the subregions calculated on the basis of respective inhomogeneity measure. Thereafter, an estimation is carried out of the motion vector of the one region on the basis of the weighing coefficients assigned to each subregion of the first region.

In the present invention, the estimation of the motion vector representative of the motion of an entire image is obtained by using an inhomogeneity measure of image blocks suitable for evaluating the reliability of these blocks on the basis of their respective frequency contents. This measure, in particular, is used for selecting one of multiplicity of block motion vectors as representative of the image motion.

It should be noted that, thanks to the evaluation of the inhomogeneity of each block, the blocks that are not capable of providing reliable information about the image motion are discarded before the calculation of the block motion vectors, thus avoiding unproductive computational efforts.

In one embodiment of the present invention the inhomogeneity information serves not only to discard unreliable blocks, but is also used for weighting the reliability of the non-discarded blocks for the purposes of obtaining the global motion vector of the image.

Another advantage derives from the fact that the method exploits the information of a large number of blocks, so that a possible block characterized by a considerable inhomogeneity (and therefore giving rise to a large weighting coefficient) but with a motion that is not representative of the image motion (due, for example, to the presence of moving objects in the scene) will have practically no influence on the image motion estimation if many other blocks provide correct information.

BRIEF DESCRIPTION OF THE SEVERAL VIEWS OF THE DRAWING(S)

Further characteristics and advantages of the invention will be brought out more clearly by the detailed description about to be given of a preferred embodiment thereof, which is to be considered as an example and not limitative in any way, said description making reference to the attached drawings of which:

FIG. 1 shows the block diagram of a possible acquisition device that implements a stabilization method in accordance with the present invention, FIG. 2 schematically illustrates the succession the three principal phases of a stabilization method, FIG. 3 shows an image sequence, FIG. 4 schematically illustrates the succession of the principal phases of a motion estimation method according to the invention, FIG. 5 shows a possible subdivision of an image into a background region and a foreground region, and FIGS. 6A and 6B show the variations in time of the motion vectors of an image sequence.

FIGS. 7A and 7B show a further example of the invention.

FIG. 8 is an example of the application of the invention.

DETAILED DESCRIPTION OF THE INVENTION

The preferred embodiment of the present invention concerns a portable device capable of acquiring digital images for video applications and, more particularly, a motion estimation method for a sequence of images in a digital video camera and a method of stabilizing the sequence.

In this connection it should be noted that the teachings of the present invention can be extended also to applications other than those explicitly mentioned in the description about to be given, for example, to image sequences acquired in mobile multimedia communication terminals of the new generation.

Figure 1:
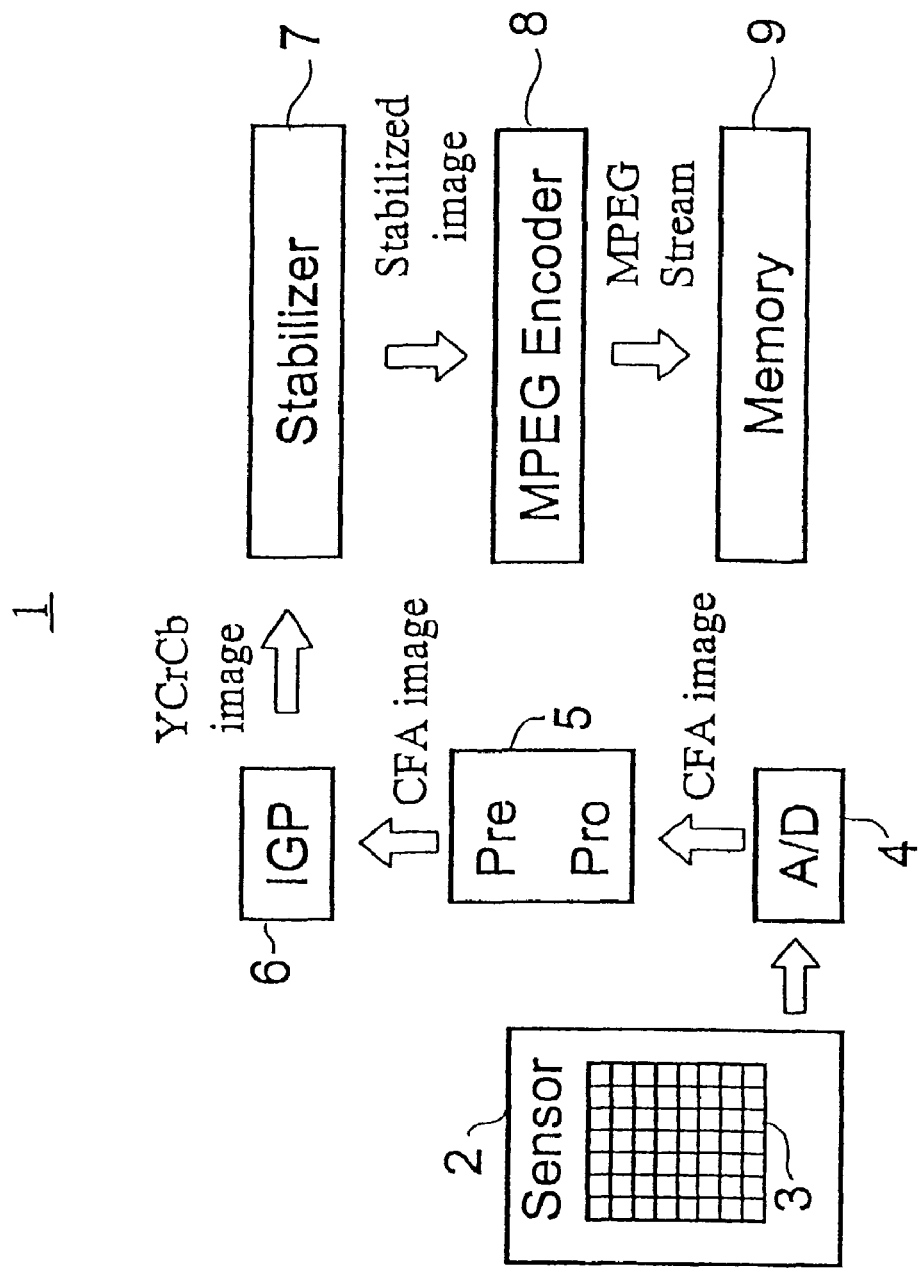

Albeit in a very schematic manner, FIG. 1 shows the function blocks of a digital video camera 1. The video camera 1 includes an acquisition block 2 comprising an optical sensor 3.

The sensor 3, which may either a CCD (Charge Coupled Device) or a CMOS (Complementary Metal Oxide Semiconductor), is an integrated circuit comprising a matrix of photosensitive cells, each of which serves to generate an electric signal proportional to the quantity of light that strikes it during the acquisition interval.

In a preferred embodiment the sensor 3 comprises an optical CFA (Color Filter Array) filter, for example, a Bayer filter.

As is well known to persons skilled in the art, in a sensor with a CFA filter only a single photosensitive cell is available for acquiring a pixel. The sensor is covered by an optical filter constituted by a matrix (a Bayer matrix in this example) of filtering elements, each of which is associated with a photosensitive cell. Each filtering element transmits to the photosensitive cell associated with it the light radiation corresponding to the wavelength of only red light, only green light or only blue light, so that for each pixel it detects only one component (of which it absorbs no more than a minimal part).

The video camera 1 also includes an analog/digital (A/D) conversion block, indicated by the reference number 4, to translate the generated electric signal into a digital value with a predetermined number of bits (generally 8, 10 or 12 bits). One may assume, solely by way of example and without thereby introducing any limitation whatsoever, that in the present invention the A/D converter 4 is such as to encode the incoming analog signals with eight-bit digital values. In that case the digital values of the pixels will be comprised between a minimum binary value equal to 0 and a maximum binary value equal to 255.

On the output side of the A/D block 4 the digital image is a CFA image, since each pixel is constituted by just a single chromatic component (R, G or B). For this reason, a single one-byte digital value is associated with each pixel.

A pre-processing (PrePro) block 5, active before and during the entire acquisition phase, is such as to interact with the acquisition block 2 and to extract from the CFA image a number of parameters useful for carrying out automatic control functions: self-focusing, automatic exposure, correction of sensor defects and white balancing.

A block 6, the so-called IGP (Image Generation Pipeline) block, is designed to perform a processing phase that, starting from the digital CFA image, will produce a complete digital image—YCrCb format, for example—in which each pixel will have associated with it three digital values (i.e., a total of 24 bits) corresponding to a luminance component Y and two chrominance components Cr and Cb. This transformation, obtained—for example—by means of interpolation, involves a passage from a representation of the image in a single plane (Bayer plane), though containing information relating to different chromatic components, to a representation in three planes.

In digital still cameras the IGP block is commonly realized in the form of a dedicated processor (CFA processor), which may be, for example, in VLSI (Very Large Scale Integration) technology.

Preferably, the IGP block 6 is also such as to perform various functions for improving the quality of the image, including, for example, filtering the noise introduced by the sensor 3, applying special effects and other functions that will generally vary from one producer to another.

Without thereby introducing any limitation, the video camera 1 preferably comprises a stabilizer block 7 that follows the IGP block 6 and is intended to perform the operations relating to the stabilization method in accordance with the present invention, so that its output will consist of a stabilized sequence of digital images.

This is followed by a compression/encoding block 8, which in this example is of the MPEG type (but could also be of other types, H263 for example), and a memory unit 9.

When acquiring a video sequence with the video camera 1, the sequence images are acquired consecutively by means of the acquisition block 2, preferably within a brief time interval between one image and the next. The MPEG-4 standard, for example, requires fifteen images to be acquired per second.

Hereinafter we shall use $Img_1$, $Img_2$, $Img_3$, ..., $Img_{n-1}$, $Img_n$, $Img_{n+1}$, ... to indicate the images acquired in sequence: $Img_1$ represents the first image of the sequence to be acquired, $Img_2$ represents the second image, and so on.

Following acquisition, each image is passed to the subsequent blocks, so that in all the subsequent processing phases the images will still be processed consecutively.

The micro-oscillations of the video camera 1 due to involuntary micro-motions of the user's hand between one acquisition and the next will generate image sequences affected by unwanted motions. It should be noted that conventionally the sequence may also contain motions purposely introduced by the operator. During the acquisition of a scene, for example, the operator may want to enlarge or reduce the field of view (zooming), or he may voluntarily move the camera to obtain a panoramic view or follow a moving personage (panning).

Once it has been acquired, each image of the sequence is converted into digital values by the A/D converter 4 and then processed by the pre-processing block 5.

After leaving the pre-processing block 5, each CFA image is sent to the IGP block 6. In this block the image is subjected to an interpolation phase and is thus transformed into a complete image, for example, in YCrCb format.

The interpolation phase may be performed, among others, with methods that are known to a person skilled in the art and are therefore obvious from the previous description.

The interpolated image in YCrCb format is then sent to the stabilizer block 7, where it undergoes processing phase by means of a stabilization method in accordance with the present invention. This processing phase produces a stabilized image as its output.

It should be noted that when an image has to be stabilized, it is conventionally required that the unwanted motions (jiggling) should be corrected/compensated, but without eliminating the motions voluntarily introduced by the operator (panning/zooming).

The choice that the stabilizer block should operate on an image in YCrCb format constitutes a preference and is not limitative for the purposes of the present invention. Nor is the fact that the stabilization method operates on interpolated to be considered as limitative: as will subsequently be explained, a possible alternative consists of applying the stabilization methods to the CFA images.

Following stabilization, each image is sent to the MPEG encoder block 8, which produces as its output a sequence or stream of images encoded/compressed in accordance to an MPEG-type encoding.

The MPEG stream of compressed images may be registered in a memory unit 9 or sent to an external peripheral device.

Figure 2:
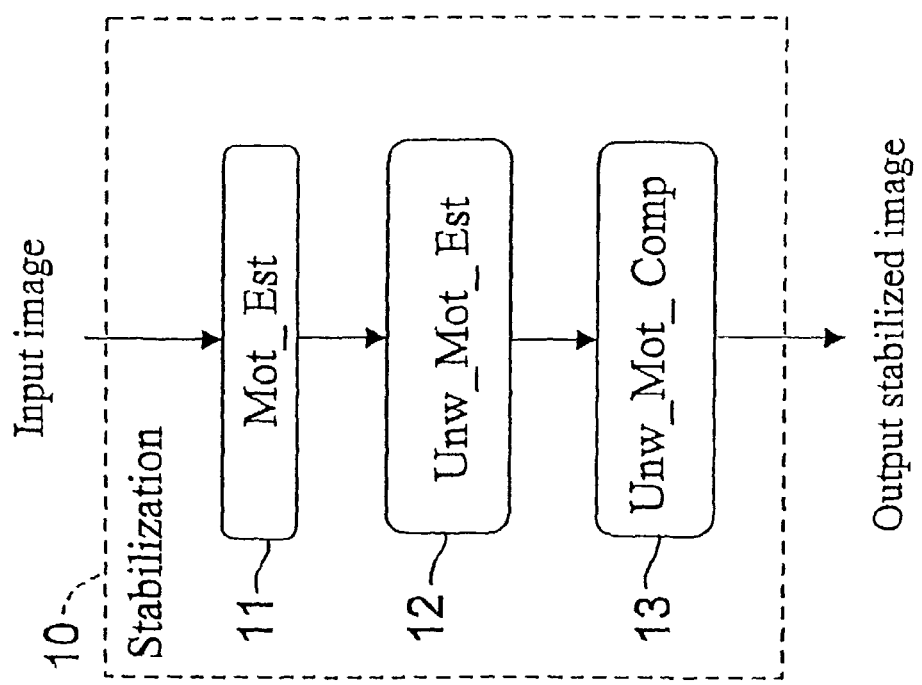

As shown in FIG. 2, in a preferred embodiment the stabilization method 10, performed in the stabilizer block 7, comprises substantially three successive phases, namely: a first phase 11 of motion estimation (Mot_Est), a second phase 12 of unwanted motion estimation (Unw_Mot_Est) and a third phase 13 of unwanted motion compensation/correction (Unw_Mot_Comp).

The first phase 11 of motion estimation (Mot_Est) is such as to estimate the motion between images of the sequence.

The motion estimated by this phase may be due either to a voluntary motion of the operator or to an unwanted motion.

Figure 3:
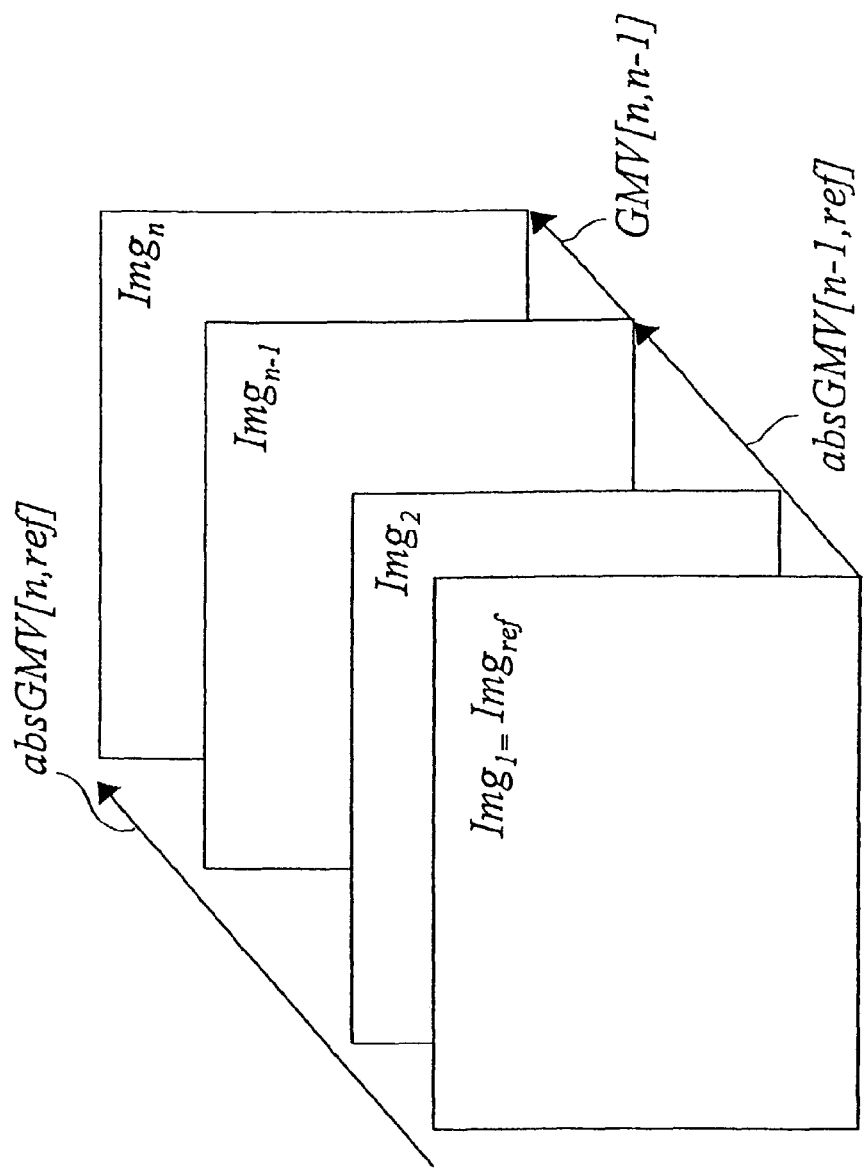

Referring now to FIG. 3, in a preferred embodiment the motion estimation phase 11 produces an absolute vector of global motion absGMV[n,ref] that comprises a translation component in the horizontal direction $absGMV_X[n,ref]$ and a translation component in the vertical direction $absGMV_Y[n,ref]$.

The absolute global motion vector absGMV[n,ref] represents the estimation of the translation motion of the input image $Img_n$ with respect to a previous image of the sequence $Img_{ref}$, which is considered as the reference image. For the sake of simplicity, we may here assume that the reference image is initially the first image of the acquired sequence, so that in practice $Img_{ref}=Img_1$.

Preferably, the estimation absGMV[n,ref] of the absolute global motion vector of an input image $Img_n$ with respect to the reference image $Img_{ref}$ is produced by estimating a global motion vector GMV[n,n−1] of the input image $Img_n$ with respect to the image $Img_{n-1}$ that immediately precedes it and then adding this vector to the absolute global motion vector absGMV[n−1,ref] estimated for the previous image $Img_{n-1}$. Put in mathematical language, for each input image $Img_n$ the Mot_Est phase produces an output vector:

$$absGMV[n,ref]=GMV[n,n-1]+absGMV[n-1,ref].$$

Returning now to FIG. 2, the second phase 12, which estimates the unwanted motion, is such as to produce for each image $Img_n$ an estimation of the unwanted motion by starting from the absolute global motion vector absGMV[n,ref] estimated in the first Mot_Est phase 11.

Lastly, a third phase 13 is such as to process the input image $Img_n$ in such a manner as to compensate the unwanted motion on the basis of the estimation of this motion produced in the second Unw_Mot_Est phase 12.

As already noted, the problem of estimating the motion of the Mot_Est phase 11 is therefore that of estimating a global motion vector between consecutive images of the sequence.

For a given input image $Img_n$ this global motion vector can be advantageously estimated by starting from the estimation of a plurality of block motion vectors, each associated with a respective sub-block of image pixels.

Figure 4:
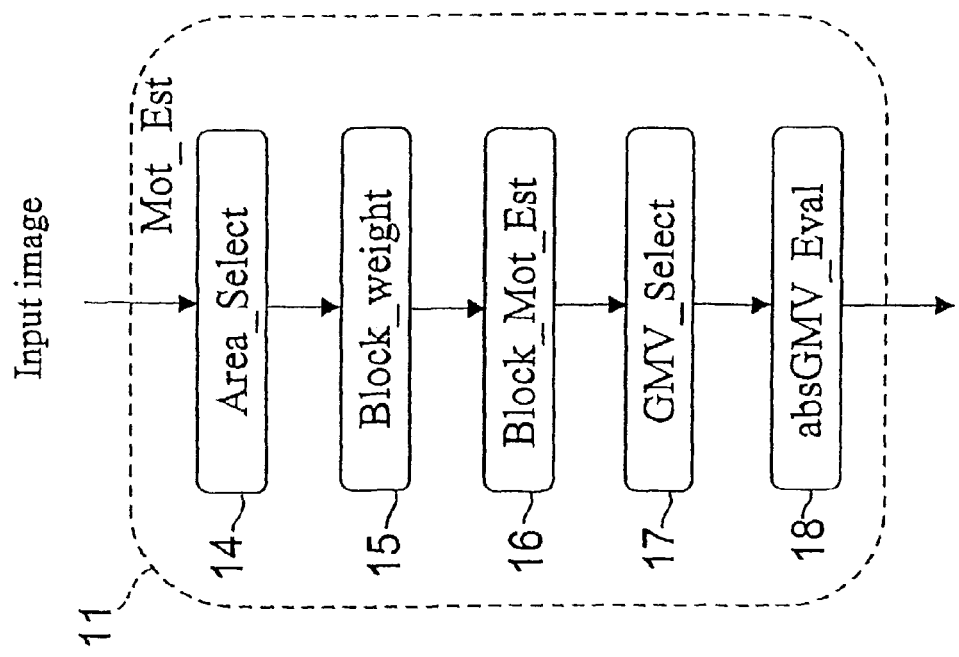

With the help of FIG. 4, we shall now describe in greater detail a particularly advantageous embodiment of the motion estimation phase 11.

Figure 5:
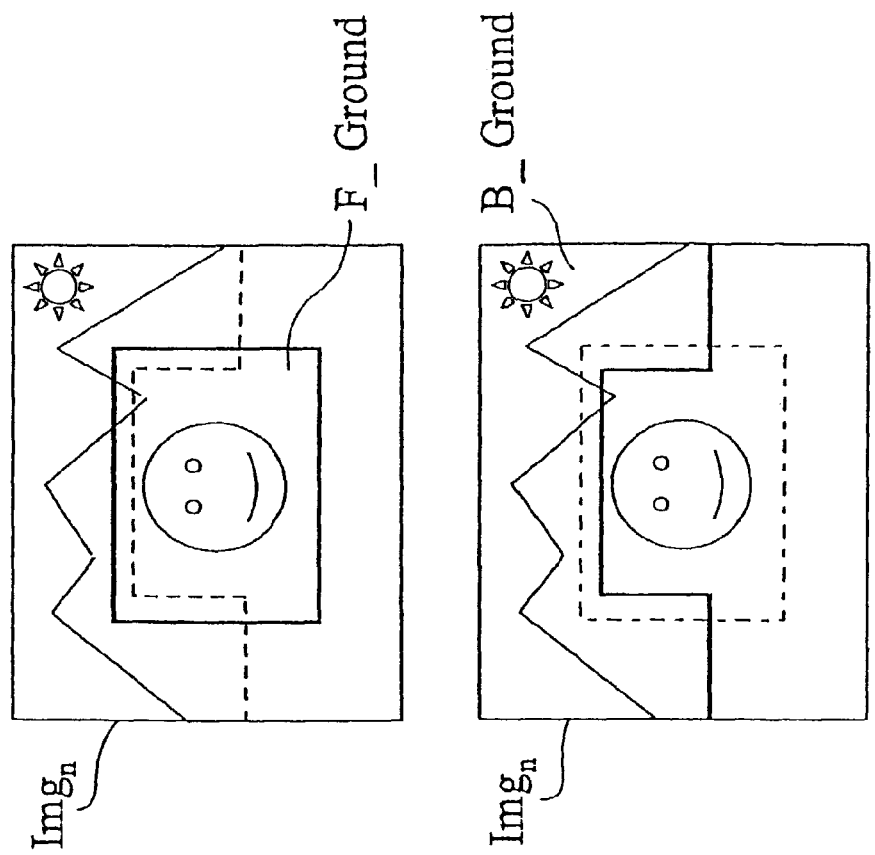

In particular, the motion estimation phase 11 comprises preferably an "area select" phase 14 which selects two regions of the image $Img_n$: a first region "B_Ground", which represents the background of the scene reproduced by the image $Img_n$, and a second region "F_Ground", which represents the foreground (see FIG. 5).

As shown in FIG. 5, the two regions may even be partially superposed and is not necessary that, taken together, they should cover the whole of the image.

As will be explained later, this preliminary subdivision makes it possible to formulate the stabilization strategy. For example, if the subject is in the foreground and substantially in a fixed or only slowly variable position, the image may be stabilized by correcting the unwanted motions (essentially due to vibrations of the video camera) after having estimated this motion by means of the oscillations that can be observed in the background of the image, i.e., by studying the motion of the background region.

But there is also another type of unwanted motion due to the presence of a subject moving rapidly across the scene. In that case the person acquiring the scene will probably not be able to appropriately "follow" the subject. In this case, which persons skilled in the art are wont to refer to as "tracking", the stabilization is performed by correcting the undesired motion after having estimated it on the basis of the motions that can be observed in the foreground.

When acquiring real scenes, the foreground is usually situated in a substantially central portion of the image, while the background is situated in the lateral and upper parts of the frame. In a preferred embodiment the Area_Select phase could therefore select the B_Ground and F_Ground regions in a predetermined manner, for example, in the precise manner shown in FIG. 5.

In a variant that calls for a greater computation effort, but also provides an optimized performance, the selection of the regions representing the foreground and the background could be made in a dynamic and adaptive manner.

In yet another alternative embodiment, the Area_Select phase 14 could select the foreground and background regions, for example, in such a manner as to be exactly superposed on each other, i.e., turn them into a single region that will represent either the background or the foreground according to a user pre-selected stabilization strategy.

Hereinafter, though without thereby introducing any limitation, we shall refer to the case in which the Area_Select phase selects the two regions in a predetermined manner in accordance with the preferred subdivision shown in FIG. 5.

As shown in FIG. 4, the Mot_Est phase 11 also comprises a weight calculation phase 15 indicated in the figure as "Block_Weight".

In this phase the B_Ground and F_Ground regions are subdivided into sub-blocks of pixels, to which we shall hereinafter refer also with the simpler term of blocks. These blocks may be, for example, small square blocks of size 8×8, 16×16, 32×32. It is, of course, also possible to make different choices as regards the size and the shape of the blocks. It will however be advantageous to make sure that the number of pixels in each block is small as compared with the size (the number of pixels) of the image.

As has already been noted, the two regions may be partially superposed, and some of the blocks could therefore form part of both the regions.

The weight calculation phase 15 sets out to associate with each block of the foreground and background regions a respective weighting coefficient W that is correlated with some inhomogeneity measure and, for example, will become greater as the inhomogeneity of the block increases. For example, a block B1 that is wholly homogeneous will be assigned a weighting coefficient W1 equal to 1 (unity). A block B2 less homogeneous than block B1 will be assigned a weighting coefficient W2 greater than one.

The inhomogeneity of a block represents the lack of uniformity existing between one or more parameters associated with the pixels of that same block and is therefore correlated with the spectral content of the block in the spatial frequency domain.

The phase of evaluating the inhomogeneities, just like the phase of calculating the block weights, serves to identify the blocks that, given their particular characteristics, can provide information about the global motion of the image Img$_n$ and possibly also serves to discard the blocks that are not very representative of the global motion of the image. In fact, the motion estimation of a substantially homogeneous block (i.e., a block with only small inhomogeneity) could be affected by a substantial error, especially when the block is situated in a similarly homogeneous portion of the image. For this reason, the motion estimation of such a block can provide completely misleading information about the global motion of the image.

Vice versa, a block with high-frequency components (for example: a block that has been appropriately focused and contains neat sides or clean-cut edges) can potentially provide very reliable information about the global motion of the image.

In a preferred embodiment the evaluation of the inhomogeneity of a block is performed by measuring the inhomogeneity of the luminance component Y of the pixels forming part of the block, since this is the component of the image for which the human eye has the greatest sensitivity.

In an alternative embodiment, the estimation of the inhomogeneity could be carried out on images that have not yet been interpolated, possibly in Bayer CFA format, taking into consideration the green pixels. The reason for this choice is that in this format the green pixels are more numerous than the others and the green component is representative of the luminance information to within a good approximation.

It should however be noted that other pixel parameters may also be used for measuring the inhomogeneity, the chromatic content being a case in point.

An inhomogeneity measure can be obtained, for example, by calculating the variance of the block or, more particularly, the variance of the luminance values of the pixels of the block. For example, given a block of size 16×16, the number of luminance values to be taken into consideration is 64. The greater the variance, the greater will be the inhomogeneity and therefore the weighting coefficient W to be associated with the block.

The variance can be calculated as:

$$\sigma = \sqrt{\frac{\sum_{i,j}(Y_{i,j} - m)^2}{N}}$$

where $Y_{i,j}$ is the luminance value of the pixel having the coordinates (i,j) in the block under consideration, m is the average luminance of the pixels of the block and N is the number of pixels in the block.

According to a preferred embodiment that implies a comparatively small computation effort, the inhomogeneity is estimated by calculating the mean absolute difference MAD:

$$MAD = \frac{\sum_{i,j}|Y_{i,j} - m|}{N}.$$

In the present invention the homogeneity is preferably also valued by calculating the "activation" A, which is a measure of the difference that exist between adjacent pixels both in the horizontal and in the vertical direction. In mathematical terms:

$$A = A_{hor} + A_{vert}$$

where $A_{hor}$ is the horizontal activation and is given by:

$$A_{hor} = \sum_{i,j}|Y_{i,j+1} - Y_{i,j}|$$

while $A_{vert}$ is the vertical activation and is given by:

$$A_{vert} = \sum_{i,j}|Y_{i+1,j} - Y_{i,j}|.$$

Advantageously, the calculation of this measure does not call for a great computational effort. Furthermore, the activation measure values the presence of both horizontal and vertical edges or transitions more accurately than the two previously described measures and is therefore particularly suitable for characterizing the inhomogeneity of a block.

Without thereby introducing any limitation whatsoever, the remainder of the present description will refer to the particular case in which the activation A is used as the inhomogeneity measure.

Once the activation has been calculated, a weighting coefficient W can be associated with each block. The table below illustrates an example of a possible association methodology:

| Activation | W |
|---|---|
| 0 < A < 10 | 1 |
| 10 ≦ A < 500 | 2 |
| 500 ≦ A < 1000 | 4 |
| 1000 ≦ A < 2000 | 8 |
| 2000 ≦ A < 4000 | 16 |
| A ≧ 4000 | 32 |

As shown by this table, the weighting coefficients W are assigned according to the range of values within which the calculated activation is comprised.

Preferably, the subsequent processing operations of the phase Mot_Est of estimating the global motion vector of the image $Img_n$ will take into consideration only the blocks that have an inhomogeneity greater than a predetermined value o or, more particularly, only blocks having a weighting coefficient W greater than a predetermined threshold value $W_{th}$, for example, equal to 2. For the sake of simplicity, these blocks will henceforth be referred to as "above-threshold" blocks.

More particularly, the Mot_Est phase comprises—as shown in FIG. 4—a further phase 16, described as Block_Mot_Est, that associates with each block of the image $Img_n$ that has an above-threshold coefficient a respective block motion vector BMV that represents the translation motion that the block in question has undergone in passing from the previous image $Imgn_{n-1}$ to the present image $Img_n$.

In accordance with the present invention, any appropriate method known to the state of the art may be used for determining a motion vector BMV to be associated with a given block.

On account of the advantages it provides in terms of reliability and computational simplicity, the algorithm described in EP 1 139 669 A1 and the article "An innovative, high quality and search window independent motion estimation algorithm and architecture for MPEG-2 encoding," F. S. Rovati et al., IEEE *Transactions on Consumer Electronics*, Vol. 46, No. 3, August 2000, will preferably be employed for this purpose. It is noted that the EP 1 139 669 A1 reference is not being incorporated by reference herein.

The conventional block motion estimation algorithm employed in the MPEG encoder of the video camera 1 may also be advantageously used in the method in accordance with the present invention.

Once a respective block motion vector BMV has been obtained for each above-threshold block, a phase 17, known as GMV_Select, selects from among all the block motion vectors BMV the particular block motion vector BMV that is most representative of the global motion of the image $Img_n$ with respect to the previous image $Img_{n-1}$.

To this end, starting from the weighting coefficients W and the block motion vectors BMV associated with the above-threshold blocks of the background region B_Ground, the phase calculates a global motion vector B_GMV representative of the motion of the background region.

Similarly, starting from the weighting coefficients W and the block motion vectors BMV associated with the above-threshold blocks of the foreground region F_Ground, the phase calculates a global motion vector F_GMV representative of the motion of the foreground region.

Preferably, the global motion vector B_GMV representative of the motion of the background region B_Ground will be calculated by constructing a bi-dimensional histogram of the block motion vectors BMV of the above-threshold blocks of the background region. In this histogram each block "votes" for its associated block vector BMV with the weighting coefficient W assigned to it.

The phase then selects from among the possible block motion vectors the one that has received the largest number of "votes", i.e., the one that produces a peak in the histogram. Let us consider, for example, the case in which a block B1 of the background region B_Ground has had associated with it a block motion vector BMV with a horizontal component $BMV_X=-1$ (i.e., translation towards the left of 1 pixel) and with a vertical component $BMV_Y=1$ (i.e., up-translation of 1 pixel) and a weighting coefficient W=4, and let us suppose that for other above-threshold blocks B2, B3, . . . , all forming part of the background region B_Ground, the associated block motion vectors and weighting coefficients are as shown in the following table:

|    | $BMV_X$ (pixel) | $BMV_Y$ (pixel) | W |
|---|---|---|---|
| B1 | −1 | 1 | 4 |
| B2 | 1 | 0 | 8 |
| B3 | −1 | 1 | 16 |
| B4 | 0 | 0 | 4 |
| B5 | 2 | 1 | 8 |
| B6 | 0 | 0 | 4 |
| B7 | −1 | −1 | 8 |

Given the data shown in this table, the bi-dimensional histogram, when expressed in the form of a table, will be as follows:

| B_GMV | Horizontal motion (X) | | | | | |
|---|---|---|---|---|---|---|
| Vertical motion (Y) |  | −2 | −1 | 0 | 1 | 2 |
|  | 2 | — | — | — | — | — |
|  | 1 | — | 4 + 16 | — | — | 8 |
|  | 0 | — | — | 4 + 4 | 8 | — |
|  | −1 | — | 8 | — | — | — |
|  | −2 | — | — | — | — | — |

In this case the motion vector B_GMV of the background region is motion vector BMV=(−1,1), because this is the vector that in the histogram has accumulated a sum of weighting coefficients W greater than any other.

It should also be noted that a two-dimensional histogram is not generally equivalent to two one-dimensional histograms of, respectively, the horizontal motion component and the vertical motion component. This is due to the fact that the correlation between the horizontal and vertical motion components is lost when two separate histograms are used. At times this loss will lead to an incorrect result.

The motion vector F_GMV representative of the motions of the foreground region F_Ground is calculated in a similar manner.

Lastly, the GMV_Select phase assigns to the image $Img_n$ a global motion vector GMV[n,n−1] by selecting one of the two global motion vectors F_GMV and B_GMV calculated for the two regions as explained above.

With a view to performing this selection operation, it counts the number N1 of the blocks with which the Mot_Est phase associated a motion vector equal to the global motion vector B_GMV chosen—by means of the histogram—as being representative of the motion of the background B_Ground.

Similarly, it will count the number N2 of blocks of the foreground region F_Ground with which the Block_Mot_Est phase associated a motion vector equal to the global motion vector F_GMV chosen—by means of the histogram—as being representative of the motion of the foreground F_Ground.

The GMV_Select phase 17 selects the global motion vector of the background region B_Ground when N1 is greater than N2, and vice versa in the contrary case. In this case one thus has $$GMV[n,n-1]=B\_GMV,$$

while in the contrary case one has $$GMV[n,n-1]=F\_GMV.$$

Advantageously, rather than being actually counted, the numbers N1 and N2 can be estimated to within a good approximation by means of the following formulas:

$$N1 = \frac{NB_{B\_Ground}}{TW_{B\_Ground}} I_{B\_Ground}[B\_GMV]$$

where $NB_{B\_Ground}$ is the number of above-threshold blocks in the background region B_Ground, $TW_{B\_Ground}$ is the sum of all the values in the histogram (i.e., the sum of all the weighting coefficients associated with above-threshold blocks of the background region), and $I_{B\_Ground}[B\_GMV]$ is the histogram value of the vector B_GMV, i.e., the peak value of the histogram.

Similarly, the phase estimates:

$$N2 = \frac{NB_{F\_Ground}}{TW_{F\_Ground}} I_{F\_Ground}[F\_GMV].$$

When the numbers N1 and N2 are estimated as shown above, one obtains an optimization of the necessary memory resources or an analogous computational saving, because the calculation is entirely based on data already contained in the histograms.

Once the vector GMV[n,n−1] representative of the motion of the motion of the image $Img_n$ with respect to the image $Img_{n-1}$, has been calculated, a final phase 18, designated as absGMV_Eval, of the motion estimation phase 11 calculates the absolute motion absGMV[n,ref] of the image $Img_n$ with respect to the image $Img_{n-1}$ of the sequence as previously explained.

On completion of the motion estimation phase 11, unwanted motion estimation phase 12 (Unw_Mot_Est) estimates the unwanted motion from the absolute global motion vector absGMV[n,ref] of the image $Img_n$.

Going into greater detail, the two translation components in the horizontal and the vertical direction of the absolute global motion vector of the image $Img_n$ are taken into individual consideration in this phase, because there exists the possibility, for example, that estimated movement in the vertical direction is due to vibration (jiggling) and therefore unwanted, whereas the motion in the horizontal direction is due a panoramic shot (panning) and has therefore been purposely introduced by the operator.

It has been noted that undesired motion having the characteristics of a random vibration will typically have a small amplitude and a zero mean value as compared with the reference image (because it rapidly changes direction).

Purposely-introduced motion, on the other hand, can attain large amplitudes and maintain the same direction for a long time. One need only think, for example, of the case in which the operator acquires a sequence by swiveling the camera around himself and always in the same direction. In some cases such voluntary movements could even grow indefinitely and cause a situation of arithmetic overflow, i.e., grow to a value that exceeds the largest number that can be represented by the memory quantity reserved therefor.

For the sake of simplicity, we shall henceforth describe the unwanted movement estimation phase 12 with sole reference to the motion component of the image $Img_n$ in the horizontal direction. The manner in which the component in the vertical direction is estimated will be rendered obvious by this description.

It should however be borne in mind that the phase of estimating the unwanted motion Unw_Mot_Est about to be described is performed in accordance with a preferred methodology. But numerous alternatives, all well known to persons skilled in the art, can also be used for this purpose.

In a preferred embodiment the unwanted motion estimation phase Unw_Mot_Est compares the horizontal component $absGMV_X[n,ref]$ of the absolute global motion vector absGMV[n,ref] estimated for the image $Img_n$ with a predetermined threshold value, which we shall henceforth refer to as the as the horizontal compensation threshold $T_{comp}^{hor}$.

If the horizontal component $absGMV_X[n,ref]$ has an amplitude smaller—the amplitude to be considered being that of the module—than the compensation threshold $T_{comp}^{hor}$, the horizontal component is associated with an unwanted motion, i.e., it is established that the horizontal motion component is due to an undesired motion. Otherwise the horizontal motion is associated with a purposely-introduced motion.

A horizontal component associated with an undesired motion activates the subsequent unwanted motion compensation (or Unw_Mot_Comp) phase 13, which horizontally translates the image $Img_n$ in the direction opposite to that of the horizontal component and by a number of pixels equal to the amplitude of the horizontal component $Img_n$, of the absolute global motion vector.

On the other hand, when the horizontal component $absGMV_X[n,ref]$ has an amplitude greater than or equal to the compensation threshold, the motion is considered to be voluntary and the subsequent unwanted motion compensation phase 13 is not activated for the horizontal component, on which there is imposed the value $$|absGMV_X[n,ref]|=T_{comp}^{hor}.$$

The absolute motion vector is thus modified by making the amplitude of the horizontal component associated with a voluntary motion equal to the horizontal compensation threshold. In other words, its amplitude is fixed at a value that coincides with the compensation threshold.

This has the advantage of making it possible to avoid this amplitude growing indefinitely when the horizontal motion component maintains the same direction for a long period of time.

In this case, when the next image $Img_{n+1}$ is being stabilized, the motion estimation phase 11 will estimate the horizontal component of the absolute global motion vector of the image $Img_{n+1}$ by means of the following formula:

$$absGMV_X[n+1, ref] = GMV_X[n+1,n] + absGMV_X[n, ref] == GMV_X[n+1,n] + T_{c\,om\,p}^{hor}.$$

When the amplitude of the horizontal component $absGMV_X[n+1,ref]$ calculated in this manner is smaller than the compensation threshold $T_{c\,om\,p}^{hor}$, the horizontal motion component $GMV_X[n+1,n]$ is interpreted as an unwanted horizontal vibration, because its direction is contrary to the direction of the wanted motion, and the compensation phase 13 is therefore activated.

It should be noted that this method of estimating the unwanted motion will also interpret the initial part of a voluntary motion as an unwanted motion (and will therefore correct/compensate it) until the compensation threshold is exceeded. Once this critical point has been passed, the remainder of the wanted motion is correctly interpreted and will not therefore be corrected/compensated. In any case, the erroneously corrected/compensated part of such a voluntary motion would be negligible, because these motions—by their very nature—are normally very extensive.

Figure 6A:
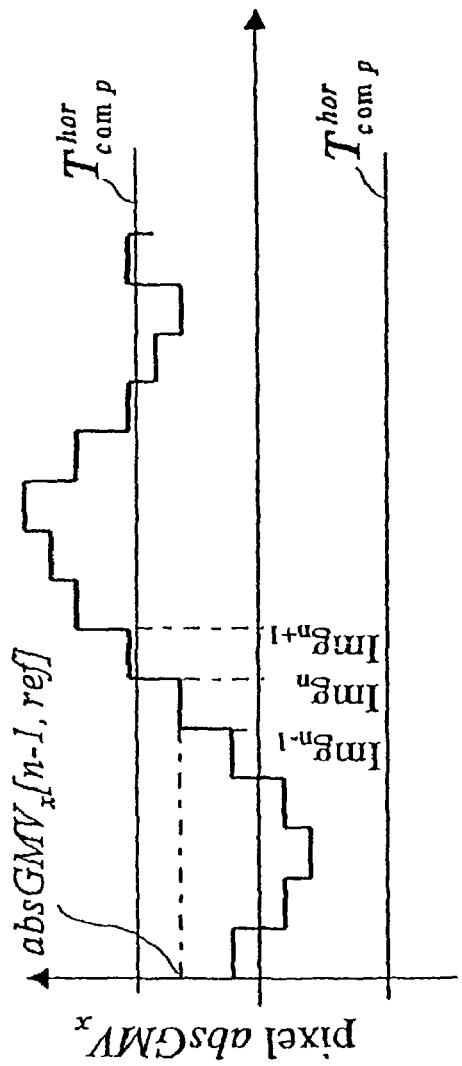
Figure 6B:
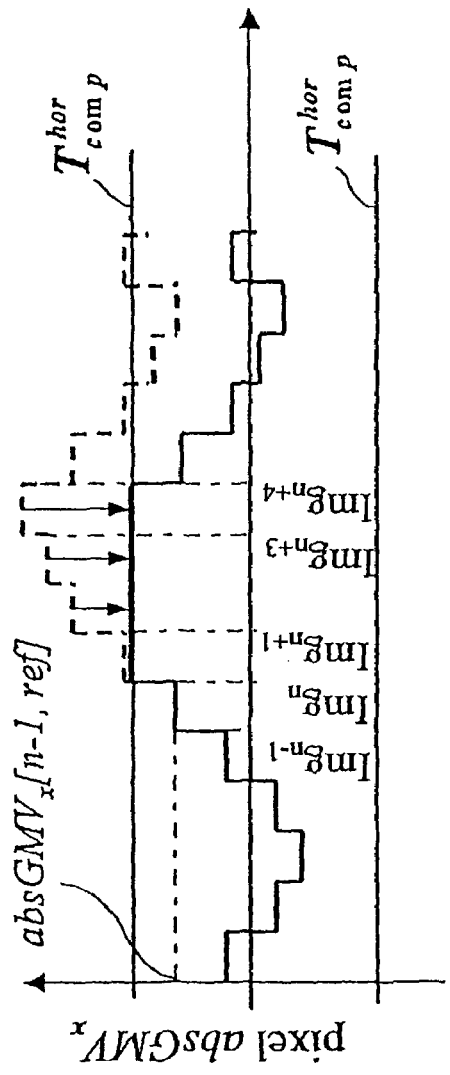

FIGS. 6a and 6b illustrate the variations in the course of time of the horizontal components of the absolute motion vectors of an image sequence. In particular, FIG. 6a shows the variations in time of the horizontal components of the absolute motion vectors that would be observed on the output side of the Mot_Est phase if the horizontal components having an amplitude greater than or equal to the compensation threshold were not to be modified.

FIG. 6b, on the other hand, illustrates the time behaviour of the absolute motion vectors after they have been modified in phase 13, the Unw_Mot_Comp phase. As can be seen, the component having an amplitude greater than the threshold are modified in such a way as to have an amplitude equal to the threshold. In FIG. 6b the horizontal motion is interpreted as unwanted as far as image $Img_{n-1}$. But from image $Img_n$ onwards and as far as image $Img_{n+3}$ the motion is interpreted as wanted. From image $Img_{n+4}$ onwards, lastly, it is again interpreted as unwanted.

Preferably, the method in accordance with the present invention will be such as to provide for the compensation threshold—in this case horizontal—to be adaptively modified on the basis of its previous history. Indeed, should it be noted that wanted motion predominates in the estimated horizontal motion, so that compensation/correction is applied only rarely (i.e., few images are being stabilized), the horizontal compensation threshold will be raised, thus rendering the method more sensitive to unwanted horizontal motions. But when corrections/compensations predominate and wanted motion is only rarely detected, the threshold will be lowered.

Advantageously, moreover, the value of the absolute global motion vector can be reduced at the end of a wanted motion (for example, it can be made equal to the compensation threshold) in order to render the stabilization more efficient in detecting unwanted motions having opposite directions.

As already explained, the unwanted motions are compensated/corrected in the unwanted motion compensation phase 13.

In this phase, for example, the image $Img_n$ will be appropriately translated in the vertical/horizontal direction as previously described in order to compensate the unwanted motion.

As will be obvious to a person skilled in the art, the translation phase will preferably be followed by an appropriate phase of re-dimensioning the image $Img_n$, because the translation will cause a part of the image to be lost/discarded. An enlargement phase may also be introduced. These phases are already known, and for this reason need no further explanation here.

In actual practice the method of stabilization in accordance with the present invention has been found not only to provide a reliable and robust estimate of the movement of a sequence, but also to be capable of appropriately distinguishing unwanted motions that have to be stabilized from purposely introduced motions.

Advantageously, moreover, the subdivision of the image into a region that represents the background and a region that represents the foreground makes it possible to obtain a motion estimation and an image stabilization that will be optimized in relation to the image content.

The possibility of choosing predefined and even partially superposed background and foreground regions also makes it possible for the stabilization method to be applied in a very flexile manner to sequences in which these regions are arranged in many different ways and have various sizes. It should be noted that this superposition does not imply any additional computation cost, because the weighting coefficients Wand the block motion vectors BMV still have to be calculated only once for regions that form part of both blocks.

In the present invention the estimation of the motion vector representative of the motion of an entire image is obtained by using an inhomogeneity measure of image blocks suitable for evaluating the reliability of these blocks on the basis of their respective frequency contents. This measure, in particular, is used for selecting one of multiplicity of block motion vectors as representative of the image motion.

It should be noted that, thanks to the evaluation of the inhomogeneity of each block, the blocks that are not capable of providing reliable information about the image motion are discarded before the calculation of the block motion vectors, thus avoiding unproductive computational efforts.

In one embodiment of the present invention the inhomogeneity information serves not only to discard unreliable blocks, but is also used for weighting the reliability of the non-discarded blocks for the purposes of obtaining the global motion vector of the image.

Another advantage derives from the fact that the method exploits the information of a large number of blocks, so that a possible block characterized by a considerable inhomogeneity (and therefore giving rise to a large weighting coefficient) but with a motion that is not representative of the image motion (due, for example, to the presence of moving objects in the scene) will have practically no influence on the image motion estimation if many other blocks provide correct information.

As far as memory occupation is concerned, it should be noted that it is also advantageous the fact that the information regarding the past history of the sequence motion is cumulatively contained in a single absolute global motion vector. It should also be noted that the discrimination between wanted and unwanted motions is obtained by means of a simple comparison with a threshold value and, consequently, does not call for a considerable computation effort.

The modification of the horizontal/vertical motion components that exceed their respective threshold values makes it possible to avoid the drawback of an indefinite growth of these components and gives rise to the further advantage of providing a stabilization method capable of reacting quickly to unwanted movements of small amplitude that occur between wanted motions that may sometimes be of considerable duration.

Unusually, moreover, the possibility of exploiting a block motion estimate provided in this manner by a conventional MPEG encoder offers substantial advantages in economic terms.

It should also be borne in mind that, even though it has here been described as part of a stabilization method, the motion estimation method in accordance with the present invention need not necessarily be employed for this purpose. For example, it could be alternatively and advantageously be used for estimating the motion of any kind of sequence of digital or digitalized photograms in alignment/registration techniques for photographic applications.

A further example can be provided in which the present invention is used for the stabilization of video sequences. Motion estimation is done using block motion vectors. In this way the same motion estimator of MPEG encoder can be used.

Acquired video sequences can be affected by unwanted motions that create poor viewing effects in the video sequence. The present invention detects these movements in the video sequence and compensates them in order to obtain a more enjoyable and better compressed output.

Digital Image Stabilization can be subdivided in three modules that execute: motion estimation, detection of unwanted movements, and compensation.

Motion estimation is done evaluating the match in a search area of subparts of the image. The size of areas and the matching function depends on the different approaches. Image subparts can cover the entire frame or can cover only a subpart. Besides, this matching can be done on a subset of original pixels (as in Representative Point Matching or RPM) or considering a Xor operation on selected binary bit planes. A matching based on edge patterns can be used. A method using Block Motion Vectors (BMV) for the Global Motion Vector (GMV) evaluation is used although authors state that in some case this algorithm has worse performance than the method based on RPM.

As shown in FIGS. 7A and 7B, the present invention uses BMV and has been shown to provide robust and reliable results. Two areas are considered in each frame identifying the foreground and background. Starting from the GMV, two weighted square histograms are built and through them a global vector for foreground area and one for background area are estimated. To each motion vector a weight is associated accordingly to the high-frequency components present in the relative block. In this way a measure of reliability is associated to each motion vector. To estimate the high-frequency components present in a block the function Activation or MAD are used. Activation is the absolute difference of consecutive elements in rows and in columns of the block. MAD is the average of deviation in the block. As illustrated in FIG. 8, if the function value is low, the block is quite homogeneous and the relative motion vector can be affected by error. Vice versa, if activation is high the associated motion vector is very reliable. FIG. 8 thus shows an image block with low MAD and an image block with high MAD.

The histogram contains the occurrence of each motion vector weighted with a value related to the evaluation function and so its maximum value will give the GMV estimation for the considered area. The resulting value will be the most reliable motion vector among the most frequent vectors. In this way a motion vector for foreground and one for background is found. To decide whether to stabilize accordingly to the first or the second the number of blocks that produce the GMV is considered. If the GMV of the background area is produced by a higher number of blocks than the GMV of foreground area, background is stabilized, if vice versa, then foreground is stabilized. In the first case unwanted camera motions are compensated and final sequence will be less affected by jiggling. In the second case the subject in the central part of image is followed and it will always be in the center of the frame creating a tracking effect.

To distinguish between panning and jiggling, the Absolute Global Motion Vector (AGMV) is considered and this value is compared to a fixed threshold. When an AGMV component overcomes this threshold a large and continuative movement has been done in a direction and so no compensation is done. Stabilization will be again allowed when the component becomes lower than threshold.

In summary, the present invention stabilizes a video sequence evaluating the GMV of each frame starting from BMV. To have a reliable estimation each BMV is considered in relation to a reliability function. Stabilization is done considering foreground or background accordingly to the sequence and discrimination between jiggling and panning has been elaborated.

A person skilled in the art, especially when having to satisfy contingent and specific needs, could introduce numerous modifications and variants into the stabilization method as described above, though without thereby overstepping the protection limits of the invention as defined by the claims set out hereinbelow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety, except as otherwise indicated.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
    estimating a global motion vector representative of motion of a digital first image with respect to a digital second image, the first and the second images forming part of a sequence of images and being made up of, respectively, a first and a second pixel matrix, said estimating the global motion vector including:
        estimating at least one motion vector of at least one region of the first image representative of motion of the at least one region from the first image to the second image, the estimating the at least one motion vector including:
            subdividing the at least one region of the first image into a plurality of pixel blocks;
            assigning to each block of the plurality a respective weighting coefficient calculated based at least in part on a respective inhomogeneity measure, the inhomogeneity measure of each block being a measure of non-uniformity of pixels of the block with respect to other pixels of the block; and
            estimating the at least one motion vector of said at least one region based at least in part on the weighting coefficient assigned to each block of the at least one region.

2. The method of claim 1, further comprising:
    associating with at least one subset of the blocks a respective block motion vector that represents an estimation of the motion of the respective block from the first image to the second image, and wherein estimating the at least one motion vector of said at least one region includes estimating the at least one motion vector of said at least one region based at least in part on said block motion vectors.

3. A method in accordance with claim 2 wherein said at least one subset comprises blocks for which the respective inhomogeneity measure is greater than a predetermined threshold value.

4. A method in accordance with claim 1 wherein said weighting coefficient is an increasing function of said inhomogeneity measure.

5. A method in accordance with claim 1 wherein said inhomogeneity measure of each block is representative of high-frequency components being present in the respective block.

6. A method in accordance with claim 1 wherein said inhomogeneity measure of each block is calculated as a variance of digital values of the pixels forming part of the respective block.

7. A method in accordance with claim 1 wherein said inhomogeneity measure is calculated for each block based on differences between digital values of adjacent pixels forming part of the respective block.

8. A method in accordance with claim 1 wherein said inhomogeneity measure is calculated for each block based at least in part on luminance components of the pixels forming part of the respective block.

9. A method in accordance with claim 1 wherein the image is in Bayer CFA format and the inhomogeneity measure is calculated for each block based at least in part on digital values of green pixels forming part of the respective block.

10. A method in accordance with claim 2 wherein estimating the at least one motion vector of said at least one region includes:
building a two-dimensional histogram by calculating for each of said block motion vectors a respective histogram value, said histogram value for a given block motion vector being calculated by adding the weighting coefficients of the blocks that have the given block motion vector associated with them; and
selecting as the at least one motion vector of said at least one region a block motion vector for which said operation of building the histogram has calculated a greatest histogram value.

11. A method in accordance with claim 2 wherein said at least one region comprises a first and a second region, said at least one motion vector includes a first motion vector and a second motion vector representative, respectively, of motion of the first and the second region, said plurality of blocks includes a first plurality of blocks forming part of the first region and a second plurality of blocks forming part of the second region, and wherein said first motion vector is estimated based at least in part on the block motion vectors and the weighting coefficients of the first plurality of blocks, and said second motion vector is estimated based at least in part on the block motion vectors and the weighting coefficients of the second plurality of blocks.

12. A method in accordance with claim 11 wherein the first region is representative of a background region of the first image and the second region is representative of a foreground region of the first image.

13. The method of claim 11, further comprising:
estimating a global motion vector of the image based at least in part on selecting one of the first and the second motion vectors.

14. The method of claim 13 wherein selecting one of the first and the second motion vectors includes:
estimating a first counting value equal to a total number of blocks of the first region with which there is associated a respective block motion vector equal to the first motion vector;
estimating a second counting value equal to a total number of blocks of the second region with which there is associated a respective block motion vector equal to the second motion vector; and
selecting the first motion vector when the first counting value is greater than the second counting value.

15. A method of stabilizing a video sequence of digital images, comprising:
subdividing at least one region of a first image into a plurality of pixel blocks;
assigning to each of the plurality of pixel blocks a respective weighting coefficient determined based at least in part on calculating a respective inhomogeneity measure for the pixel block, the inhomogeneity measure being a measure of non-uniformity pixels of the pixel block with respect to other pixels of the pixel block;
estimating at least one motion vector representative of motion of the at least one region of the first image respective to a second image, wherein the first and the second images form part of a sequence of digital images, the estimating based at least in part on the respective weighting coefficients assigned to the plurality of pixel blocks of the at least one region;
estimating a global motion vector representative of motion of the first digital image with respect to the second digital image based at least in part on the estimated at least one motion vector; and
processing the first image to compensate for unwanted motion based at least in part on the global motion vector.

16. The method of claim 15 wherein the estimating the at least one motion vector of said at least one region includes:
constructing a two-dimensional histogram by calculating for each of said block motion vectors a respective histogram value, said histogram value for a given block motion vector being calculated by summing the weighting coefficients of the blocks that have the given block motion vector associated with them; and
selecting as the at least one motion vector of said at least one region a block motion vector for which said operation of constructing the histogram has calculated a greatest histogram value.

17. The method of claim 16 wherein said at least one region comprises a first and a second region, said at least one motion vector includes a first motion vector and a second motion vector representative, respectively, of motion of the first and the second region, said plurality of pixel blocks includes a first plurality of pixel blocks forming part of the first region and a second plurality of pixel blocks forming part of the second region, and wherein said first motion vector is estimated based at least in part on the block motion vectors and the weighting coefficients of the first plurality of pixel blocks, and said second motion vector is estimated based at least in part on the block motion vectors and the weighting coefficients of the second plurality of pixel blocks, and wherein the estimating a global motion vector of the image is based at least in part on selecting one of the first and the second motion vectors.

* * * * *